(12) United States Patent
Nelson et al.

(10) Patent No.: US 9,699,411 B2
(45) Date of Patent: Jul. 4, 2017

(54) INTEGRATION OF VIDEOCONFERENCING WITH INTERACTIVE ELECTRONIC WHITEBOARD APPLIANCES

(71) Applicants: Steven Nelson, San Jose, CA (US); Lana Wong, Randolph, NJ (US); Hiroshi Kitada, Tuckahoe, NY (US)

(72) Inventors: Steven Nelson, San Jose, CA (US); Lana Wong, Randolph, NJ (US); Hiroshi Kitada, Tuckahoe, NY (US)

(73) Assignee: Ricoh Company, Ltd., Toyko (JP)

( * ) Notice: Subject to any disclaimer, the term of this patent is extended or adjusted under 35 U.S.C. 154(b) by 6 days.

(21) Appl. No.: 14/708,186

(22) Filed: May 9, 2015

(65) Prior Publication Data
US 2016/0330404 A1 Nov. 10, 2016

(51) Int. Cl.
*H04N 7/14* (2006.01)
*H04N 7/15* (2006.01)
*H04L 12/18* (2006.01)
*H04M 3/56* (2006.01)

(52) U.S. Cl.
CPC ........... *H04N 7/15* (2013.01); *H04L 12/1813* (2013.01); *H04M 3/567* (2013.01)

(58) Field of Classification Search
CPC ............... G06F 3/0482; G06F 3/04842; H04L 12/1813; H04M 3/56–3/569; H04M 2203/50–2203/509
USPC .... 348/14.01–14.16; 370/259–271, 351–357
See application file for complete search history.

(56) References Cited

U.S. PATENT DOCUMENTS

| | | | | |
|---|---|---|---|---|
| 6,906,741 B2 * | 6/2005 | Canova, Jr. | ........... | G06F 1/1626 348/14.01 |
| 8,140,997 B2 * | 3/2012 | Nemoto | .................. | G06F 3/048 715/790 |
| 2002/0026323 A1 * | 2/2002 | Sakaguchi | ............. | G06Q 10/10 715/230 |
| 2004/0236830 A1 * | 11/2004 | Nelson | .............. | H04L 29/06027 709/204 |

(Continued)

*Primary Examiner* — Hemant Patel
(74) *Attorney, Agent, or Firm* — Hickman Palermo Becker Bingham LLP; Edward A. Becker

(57) ABSTRACT

An interactive whiteboard appliance includes the capability to integrate and manage, in a user-friendly manner, interactive electronic whiteboard sessions and videoconferencing sessions between the interactive whiteboard appliance and one or more client devices. An application manager executing on the interactive whiteboard appliance manages an interactive whiteboard application and a collaboration client executing on the interactive whiteboard appliance to maintain a videoconferencing session window on top of an interactive whiteboard session window during videoconferencing sessions. The application manager also provides graphical user interface controls displayed on the interactive whiteboard appliance that allow users to initiate and manage interactive electronic whiteboard sessions and videoconferencing sessions, including switching between interactive electronic whiteboard sessions and videoconferencing sessions. The approach may be implemented on interactive whiteboard appliances that are not natively configured to allow users to select and/or switch control between an interactive whiteboard session window and a videoconferencing session window.

20 Claims, 9 Drawing Sheets

(56) References Cited

U.S. PATENT DOCUMENTS

| | | | | |
|---|---|---|---|---|
| 2006/0248471 A1* | 11/2006 | Lindsay | ................ | G06F 3/0481 |
| | | | | 715/800 |
| 2008/0184115 A1* | 7/2008 | Back | ...................... | G06Q 10/00 |
| | | | | 715/702 |
| 2012/0278738 A1* | 11/2012 | Kruse | .................... | G06Q 10/10 |
| | | | | 715/754 |
| 2013/0263021 A1* | 10/2013 | Dunn | .................. | H04L 12/1827 |
| | | | | 715/756 |
| 2015/0134737 A1* | 5/2015 | Albrecht | ............ | H04L 12/1822 |
| | | | | 709/204 |

\* cited by examiner

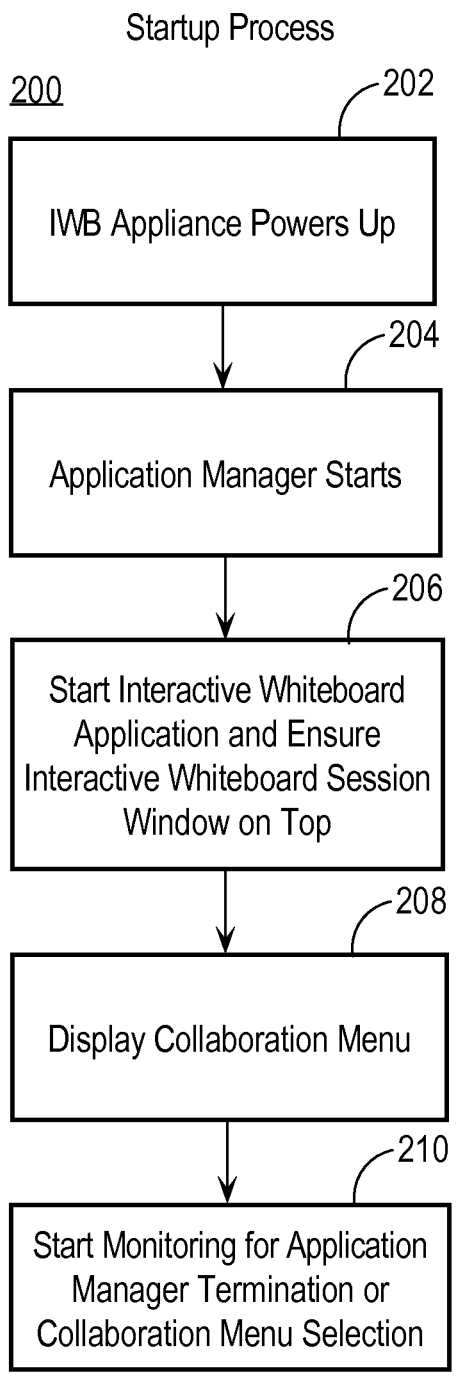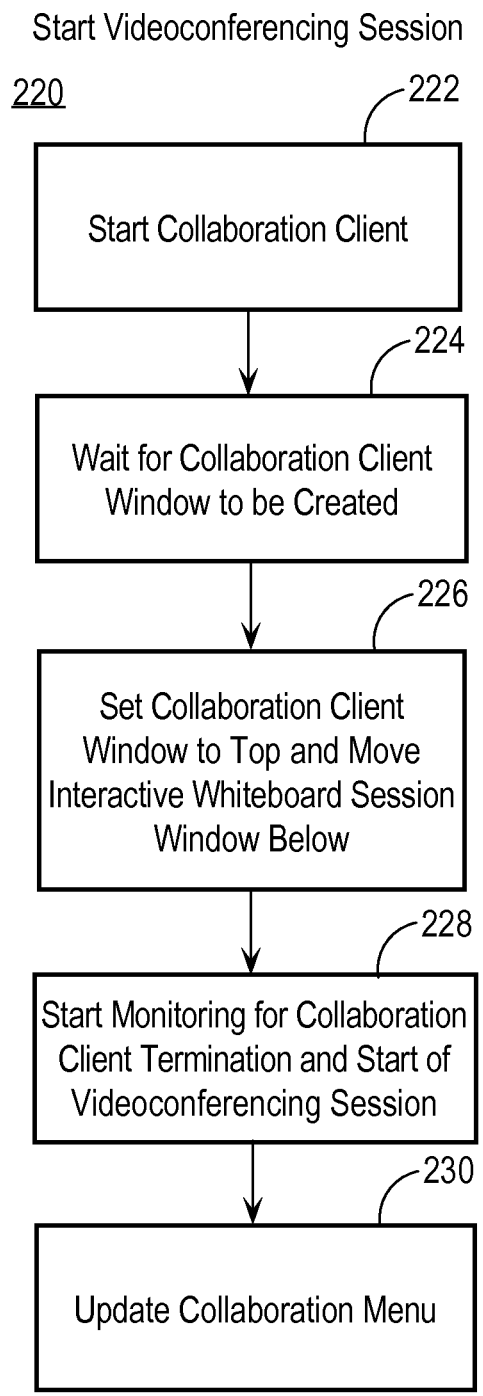

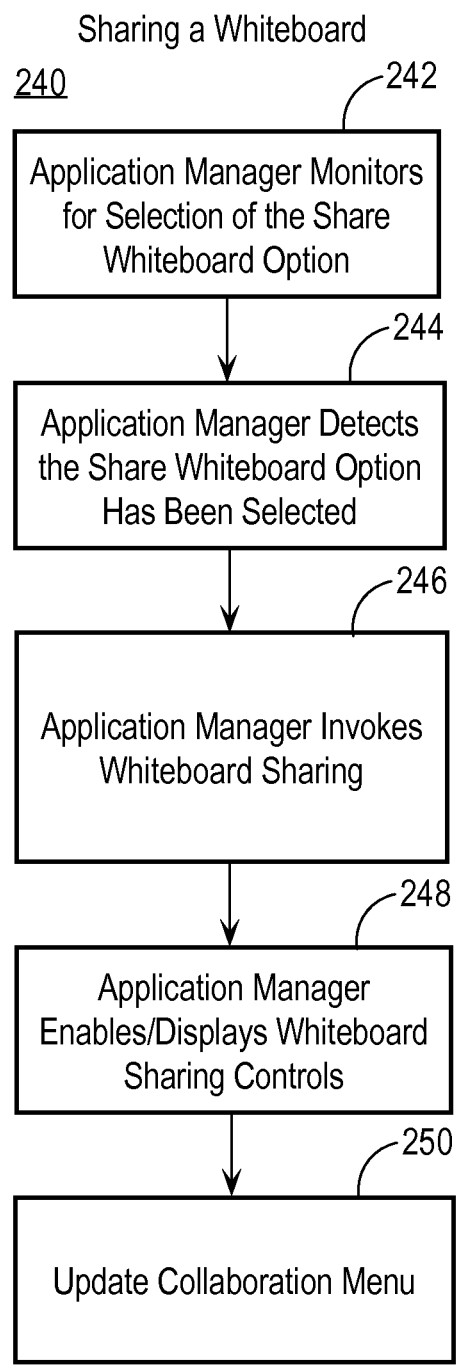

INTEGRATION OF VIDEOCONFERENCING WITH INTERACTIVE ELECTRONIC WHITEBOARD APPLIANCES

RELATED APPLICATION DATA AND CLAIM OF PRIORITY

None

FIELD OF THE INVENTION

Embodiments relate generally to integrating videoconferencing with interactive electronic whiteboard appliances.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Interactive electronic whiteboard appliances allow users to view and make changes to electronic information and have the changes propagated to other devices. There is limited capability, however, to use other applications on interactive whiteboard appliances concurrent with the sharing of an electronic whiteboard.

SUMMARY

An interactive whiteboard appliance includes a display, a communications interface, one or more processors, one or more memories, an operating system executing on the interactive whiteboard appliance and having an application programming interface that provides access to functionality supported by the operating system, an interactive whiteboard application configured to display an interactive whiteboard window on the display of the interactive whiteboard appliance, a collaboration client configured to support one or more videoconferencing sessions with one or more collaboration clients executing on one or more client devices that are external to the interactive whiteboard appliance including displaying a videoconferencing window on the display of the interactive whiteboard appliance and an application manager. The application manager is configured to cause a menu to be displayed on the display of the interactive whiteboard appliance that includes one or more options for switching between the interactive whiteboard application window and the videoconferencing window and detect a user selection of a particular option from the one or more options for switching between the interactive whiteboard window and the videoconferencing window. The application manager is further configured to manage display of the interactive whiteboard window and the videoconferencing window in response to detecting the user selection of the particular option from the one or more options for switching between the interactive whiteboard application window and the videoconferencing window.

BRIEF DESCRIPTION OF THE DRAWINGS

In the figures of the accompanying drawings like reference numerals refer to similar elements.

FIG. 2A is a flow diagram that depicts example activities performed during a startup process of an interactive whiteboard appliance.

FIG. 2B is a flow diagram that depicts example activities performed during startup of a videoconferencing session.

FIG. 2C is a flow diagram that depicts a process for sharing a whiteboard after a videoconferencing session has been established.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
   A. Interactive Whiteboard Appliance
   B. Collaboration Server
   C. Client Devices
III. ELECTRONIC WHITEBOARD AND VIDEOCONFERENCING SESSION INTEGRATION
   A. Startup
   B. Establishing a Videoconferencing Session
   C. Sharing a Whiteboard
IV. IMPLEMENTATION MECHANISMS

I. Overview

An interactive whiteboard appliance includes the capability to integrate and manage, in a user-friendly manner, interactive electronic whiteboard sessions and videoconferencing sessions between the interactive whiteboard appliance and one or more client devices. An application manager executing on the interactive whiteboard appliance manages an interactive whiteboard application and a collaboration client executing on the interactive whiteboard appliance to maintain a videoconferencing session window on top of an interactive whiteboard session window during videoconferencing sessions. The application manager also provides graphical user interface controls displayed on the interactive whiteboard appliance that allow users to initiate and manage interactive electronic whiteboard sessions and videoconferencing sessions, including switching between interactive electronic whiteboard sessions and videoconferencing sessions. The approach may be implemented on interactive whiteboard appliances that are not natively configured to allow users to select and/or switch control between an interactive whiteboard session window and a videoconferencing session window.

II. System Architecture

Figure 1:
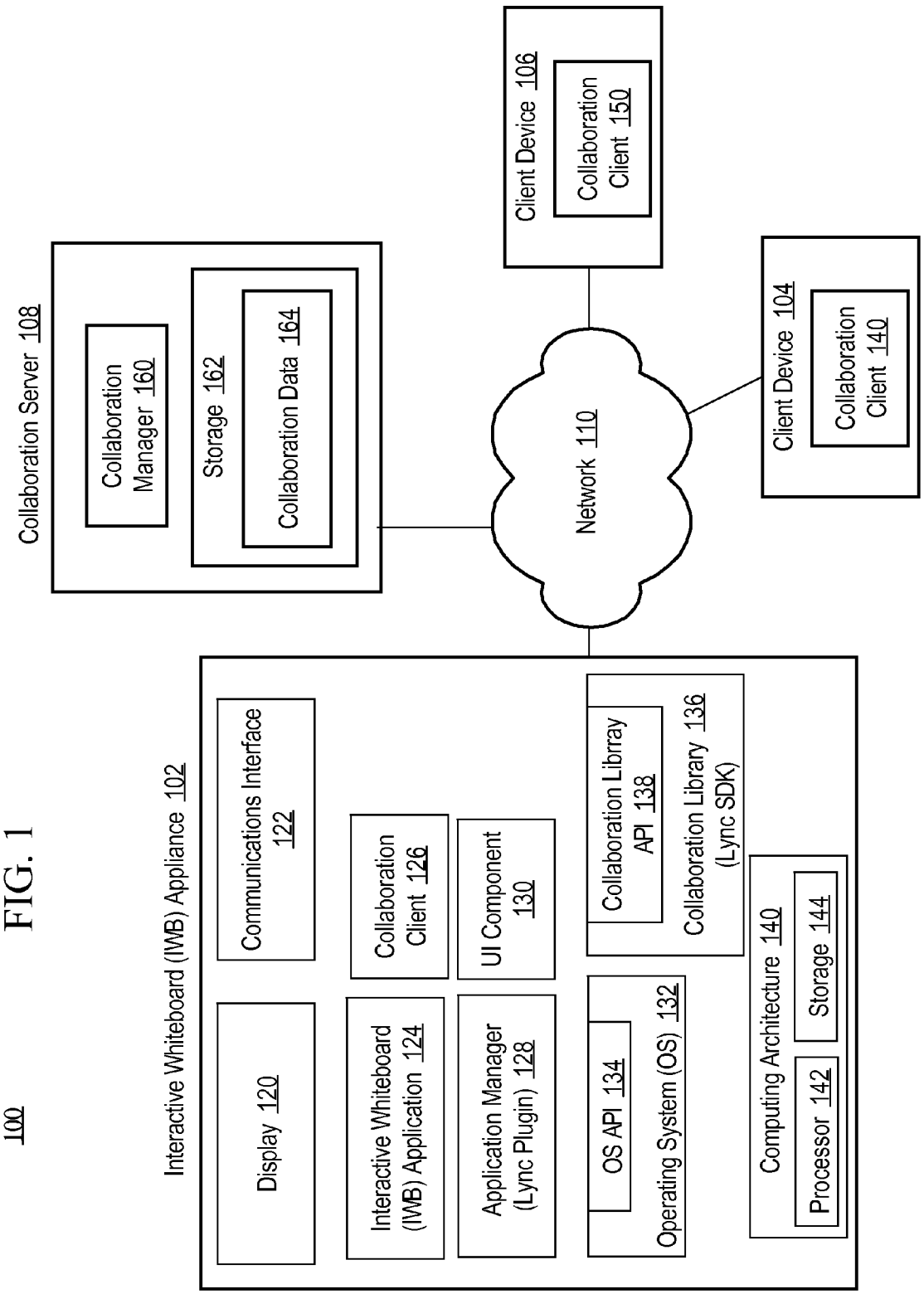
FIG. 1 is a block diagram that depicts an arrangement for integrating videoconferencing services with an interactive whiteboard appliance.

FIG. 1 is a block diagram that depicts an arrangement 100 for integrating videoconferencing services with an interactive whiteboard appliance. Arrangement 100 includes an interactive whiteboard appliance 102, client devices 104, 106 and a collaboration server 108, communicatively coupled via a network 112. Arrangement 100 is not limited the particular elements depicted in FIG. 1 and may include fewer or additional elements depending upon a particular implementation. Embodiments are described herein in the context of a single interactive whiteboard appliance 102 for purposes of explanation, but the approach is applicable to any number of interactive whiteboard appliances. Network 112 is depicted in FIG. 1 as a single network for purposes of explanation only and network 112 may include any number and type of wired or wireless networks, such as local area networks (LANs), wide area networks (WANs), the Internet, etc. The various elements depicted in FIG. 1 may also communicate with each other via direct communications links that are not depicted in FIG. 1 for purposes of explanation.

A. Interactive Whiteboard Appliance

Interactive whiteboard appliance 102 is an electronic whiteboard that supports interactive electronic whiteboard sessions and videoconferencing sessions with other devices. The interactive whiteboard appliance 102 includes the capability to manage interactive electronic whiteboard sessions and videoconferencing sessions in a user-friendly manner by maintaining a videoconferencing session window on top of an interactive whiteboard session window during videoconferencing sessions. The interactive whiteboard appliance 102 also provides graphical user interface controls that allow users to initiate and manage interactive electronic whiteboard sessions and videoconferencing sessions, including switching between interactive electronic whiteboard sessions and videoconferencing sessions. The approaches described herein are applicable to interactive whiteboard appliances that are not natively configured to allow users to select and/or switch control between an interactive whiteboard session window and a videoconferencing session window.

In the example depicted in FIG. 1, interactive whiteboard appliance 102 includes a display 120, a communications interface 122, an interactive whiteboard (IWB) application 124, a collaboration client 126, an application manager 128, a user interface (UI) component 130, an operating system (OS) 132 having an OS application programming interface (API) 134, a collaboration software development kit (SDK) 136 with a collaboration SDK API 138 and storage 144. These elements are described in more detail hereinafter. Interactive whiteboard appliance 102 may include fewer or more components that those depicted in FIG. 1 and described herein and the particular components used may vary depending upon a particular implementation and interactive whiteboard appliance 102 is not limited to a particular set of components or features. For example, interactive whiteboard appliance 102 may also include manual controls, such as buttons, slides, etc., not depicted in FIG. 1, for performing various functions on mobile device, such as powering on/off or changing the state of interactive whiteboard appliance 102 and/or display 120.

Display 120 may be implemented by any type of display that displays images and information to a user and may also be able to receive user input and embodiments are not limited to any particular implementation of display 120. As one non-limiting example, display 120 may be a touchscreen display 120 that both displays information to users and allows user to select graphical user interface objects. Interactive whiteboard appliance 102 may have any number of displays 120, of similar or varying types, located anywhere on interactive whiteboard appliance 102.

Communications interface 122 may include computer hardware, software, or any combination of computer hardware and software to provide wired and/or wireless communications between interactive whiteboard appliance 102 and other devices and/or networks, such as collaboration server 108 and client devices 104, 106. The particular components for communications interface 130 may vary depending upon a particular implementation and embodiments are not limited to any particular implementation of communications interface 130.

Interactive whiteboard (IWB) application 124 is an application that executes on interactive whiteboard appliance 102 and, in conjunction with collaboration server 108, manages interactive whiteboard sessions between interactive whiteboard appliance 102 and other devices.

Collaboration client 126 is an application that executes on interactive whiteboard appliance 102 and, in conjunction with collaboration server 108, supports videoconferencing sessions between interactive whiteboard appliance 102 and other devices. One non-limiting example implementation of collaboration manager 160 is a Microsoft Lync Client.

Application manager 128 is an application that executes on interactive whiteboard appliance 102 and manages interactive electronic whiteboard sessions and videoconferencing sessions between interactive whiteboard appliance 102 and other devices using functionality provided by OS 132 and collaboration library 136. Application manager 128 also, in conjunction with UI component 130, provides graphical user interface controls on display 120 that allow users to initiate and manage interactive electronic whiteboard sessions and videoconferencing sessions, including switching between interactive electronic whiteboard sessions and videoconferencing sessions. Although depicted in FIG. 1 as a separate element, application manager 128 may be integrated into interactive whiteboard application 124, for example, as a plug-in component.

Operating system 132 executes on computing architecture 140 and may be any type of operating system that may vary depending upon a particular implementation and embodiments are not limited to any particular implementation of operating system 132. Operating system 132 may include multiple operating systems of varying types, depending upon a particular implementation. OS API 134 provides access to functionality provided by OS 132. For example, interactive whiteboard application 124 may use OS API 134 to initiate or instantiate functionality provided by OS 132.

Collaboration library 136 provides functionality for establishing and managing videoconferencing sessions between collaboration client 126 and collaboration clients on other devices, such as collaboration client 146, 150. Collaboration library API 138 provides access to the functionality provided by collaboration library 136. For example, interactive whiteboard application 124 may invoke functionality provided by collaboration library 136 using collaboration library API 138. Functionality provided by collaboration library 136 may be provided, for example, by one or more applications and/or routines provided by the Microsoft Lync SDK.

Computing architecture 140 may include various elements that may vary depending upon a particular implementation and interactive whiteboard appliance 102 is not limited to any particular computing architecture 140. In the example depicted in FIG. 1, computing architecture includes a processor 142 and storage 144. Processor 142 may be any number and types of processors and storage 144 may be implemented by any number and types of memories, including volatile memory and non-volatile memory, which may vary depending upon a particular implementation. Computing architecture 140 may include additional hardware, firmware and software elements that may vary depending upon a particular implementation.

B. Collaboration Server

Collaboration server 108 may be implemented as any types of data repository for storing data. In the example depicted in FIG. 1, collaboration server 108 includes a collaboration manager 160 and storage 162. Collaboration manager 160 manages videoconferencing sessions conducted between interactive whiteboard appliance 102 and client devices 104, 106. One non-limiting example implementation of collaboration manager 160 is a Microsoft Lync Server. Storage 162 may be implemented by any number and types of memories, including volatile memory and non-volatile memory, which may vary depending upon a particular implementation. Storage 162 includes collaboration data 164 that stores information pertaining to videoconferencing sessions conducted between interactive whiteboard appliance 102 and client devices 104, 106. Collaboration server 108 may include various other components that may vary depending upon a particular implementation and collaboration server 108 is not limited to a particular set of components or features.

C. Client Device

Client devices 104, 106 may be any type of client devices and examples of client devices 104, 106 include, without limitation, a workstation, a personal computer, a laptop computer, a tablet computing device, a personal digital assistant or a smart phone. Client device 104, 106 include collaboration clients 140, 150, respectively, that support videoconferencing sessions conducted between interactive whiteboard appliance 102 and client devices 104, 106. One non-limiting example implementation of collaboration client 146, 150 is a Microsoft Lync Client.

III. Electronic Whiteboard and Videoconferencing Session Integration

The application manager 128 on interactive whiteboard appliance 102 is configured to cause to be generated and displayed graphical user interface controls that allow users to initiate and manage interactive electronic whiteboard sessions and videoconferencing sessions, including switching between interactive electronic whiteboard sessions and videoconferencing sessions. This includes maintaining a videoconferencing session window on top of an interactive whiteboard session window during videoconferencing sessions.

A. Startup

FIG. 2A is a flow diagram 200 that depicts example activities performed during a startup process of interactive whiteboard appliance 102. In step 202, interactive whiteboard appliance 102 is powered up, for example, in response to a user physically switching on interactive whiteboard appliance 102, or in response to interactive whiteboard appliance 102 detecting an electronic signal. In step 204, application manager 128 is started and in step 206, interactive whiteboard application 124 is started. Interactive whiteboard application 124 may display content, allow a user to change how the content is displayed and allow the user to update the content, although at this point changes to the content are not being propagated to another device. According to one embodiment, application manager 128 ensures that interactive whiteboard session window 302 is topmost on interactive whiteboard display 300. This may include, for example, determining an operating system-level identification of the interactive whiteboard session window 302 and then invoking one or more functions in OS 132 to cause the interactive whiteboard session window 302 to remain on top. For example, in the context of a Microsoft windows OS, a FindWindow( ) function using a class name of the interactive whiteboard session window 302 may be invoked to determine and OS-level identifier for the interactive whiteboard session window 302, followed by a call to set the WS_EX_TOPMOST bit in the GWL_EXSTYLE field for the interactive whiteboard session window 302.

Figure 3A:
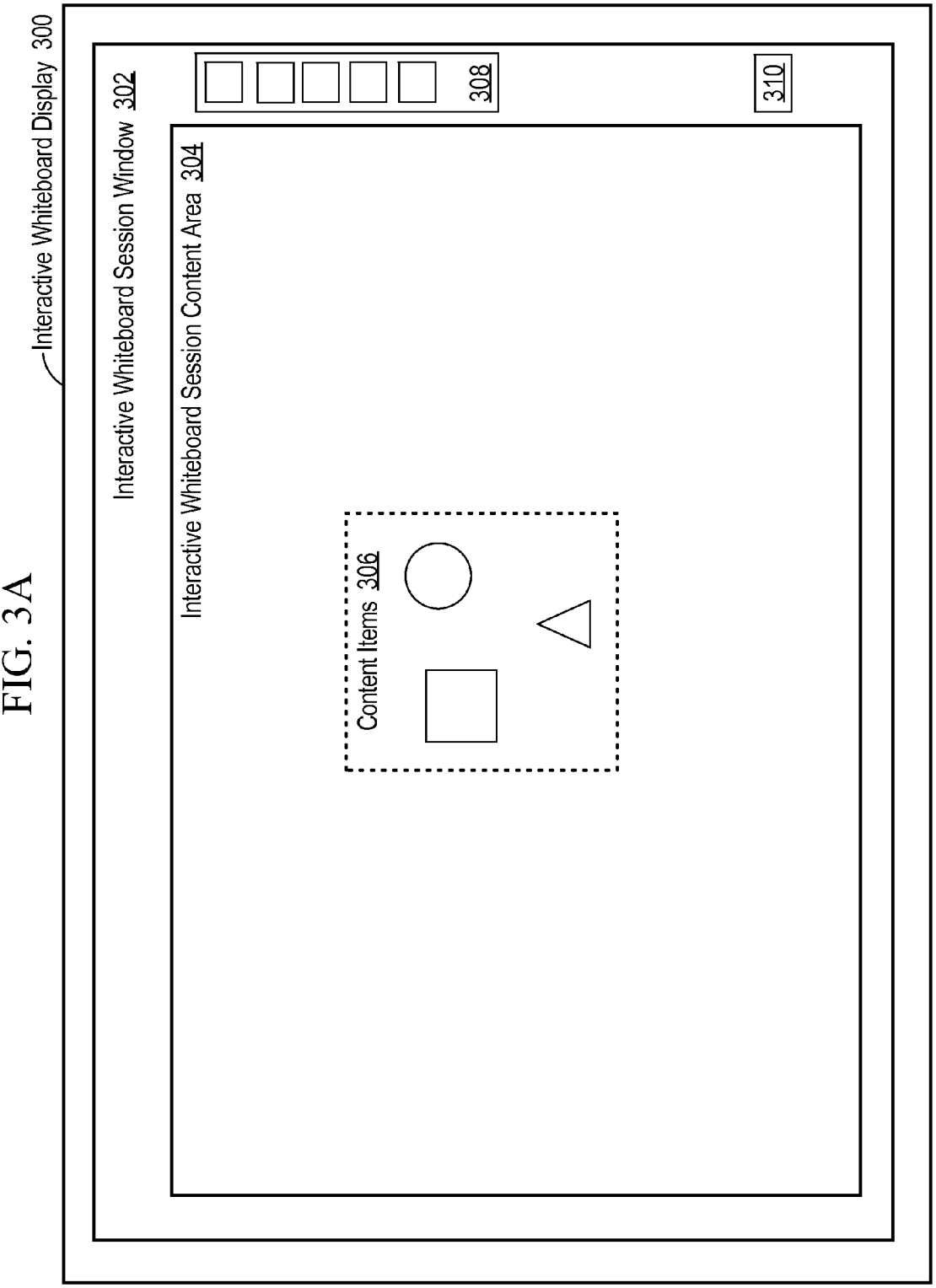
FIG. 3A depicts an example interactive whiteboard display after an interactive whiteboard appliance has been powered up.
Figure 3B:
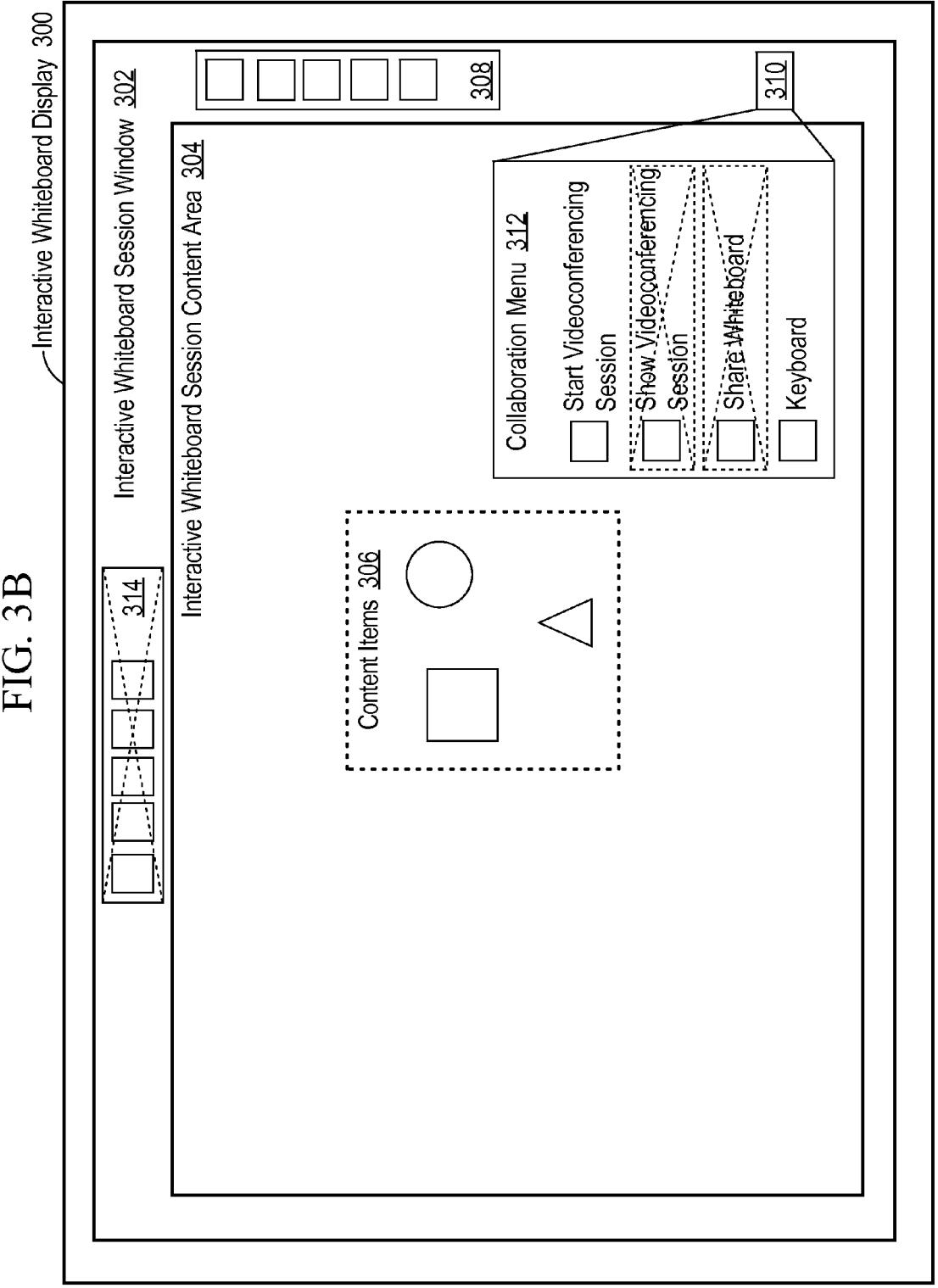
FIG. 3B depicts the display of a collaboration menu after selection of a collaboration menu icon.

FIG. 3A depicts an example interactive whiteboard display 300 after interactive whiteboard appliance 102 has been powered up. Interactive whiteboard display 300 may be, for example, display 120 of FIG. 1 and includes an interactive whiteboard session window 302 and an interactive whiteboard session content area 304 that displays content items 306. A set of interactive whiteboard controls 308 allows a user to perform various functions with respect to interactive whiteboard session window 302, such as rotate, zoom and start annotation. A collaboration menu icon 310 is displayed and as depicted in FIG. 3B, selection of the collaboration menu icon 310 causes a collaboration menu 312 to be displayed in step 208. Collaboration menu 312 provides user access to various controls for initiating and switching between an interactive whiteboard session window and a videoconferencing session window. At this point in time there is no current active videoconferencing session, so the "Show Videoconferencing Session" and "Share Whiteboard" menu options are disabled. The "Keyboard" menu option provides access to virtual keyboard displayed on display 120. In addition, a set of interactive whiteboard sharing controls 314 is disabled, since at this point in time there is no sharing of interactive whiteboard session window 302 with another device. In other embodiments, interactive whiteboard sharing controls 314 may not be displayed at all until interactive whiteboard session window 302 is shared with another device.

In step 210, application manager 128 starts monitoring for termination of the application manager 128 or for creation of a videoconferencing session via a selection from collaboration menu 312. For example, application manager 128 may instantiate a process that monitors for deletion of the interactive whiteboard application 124.

B. Establishing a Videoconferencing Session

FIG. 2B is a flow diagram 220 that depicts example activities performed during startup of a videoconferencing session. In step 222, in response to user selection of the "Start Videoconferencing Session" item from the collaboration menu 312, application manager 128 invokes the collaboration client 126. This may include, for example, invoking one or more OS-level functions to invoke the collaboration client 126 and in step 224, wait for a collaboration client window to be created. Once confirmation has been received that a collaboration client window has been created, then in step 226, the collaboration client window is set to the top and the interactive whiteboard session window is moved below. This may be accomplished by application manager 128 invoking one or more OS-level functions in OS 132. For example, in the context of a Microsoft windows OS, a FindWindow( ) function using a class name of the collaboration client window may be invoked to determine and OS-level identifier for the collaboration client window.

The WS_EX_TOPMOST bit in the GWL_EXSTYLE field for the collaboration client window may then be set to move the collaboration client window to the top and the WS_EX_TOPMOST bit in the GWL_EXSTYLE field for the interactive whiteboard session window 302 removed or unset to move the interactive whiteboard session window 302 below. Notification may also be made to collaboration manager 160 that the interactive whiteboard appliance 102 is now active and available to participate in videoconferencing sessions. Collaboration manager 160 may update collaboration data 164 to indicate this condition. In step 228, the application manager 128 starts monitoring for termination of the collaboration client 126 and start of a videoconferencing session. If termination of the collaboration client 126 is detected, then the interactive whiteboard session window 302 may be moved to the top as previously described. If start of a videoconferencing session is detected, then the videoconferencing session window is moved to the top. In step 230, the collaboration menu is updated.

Figure 3C:
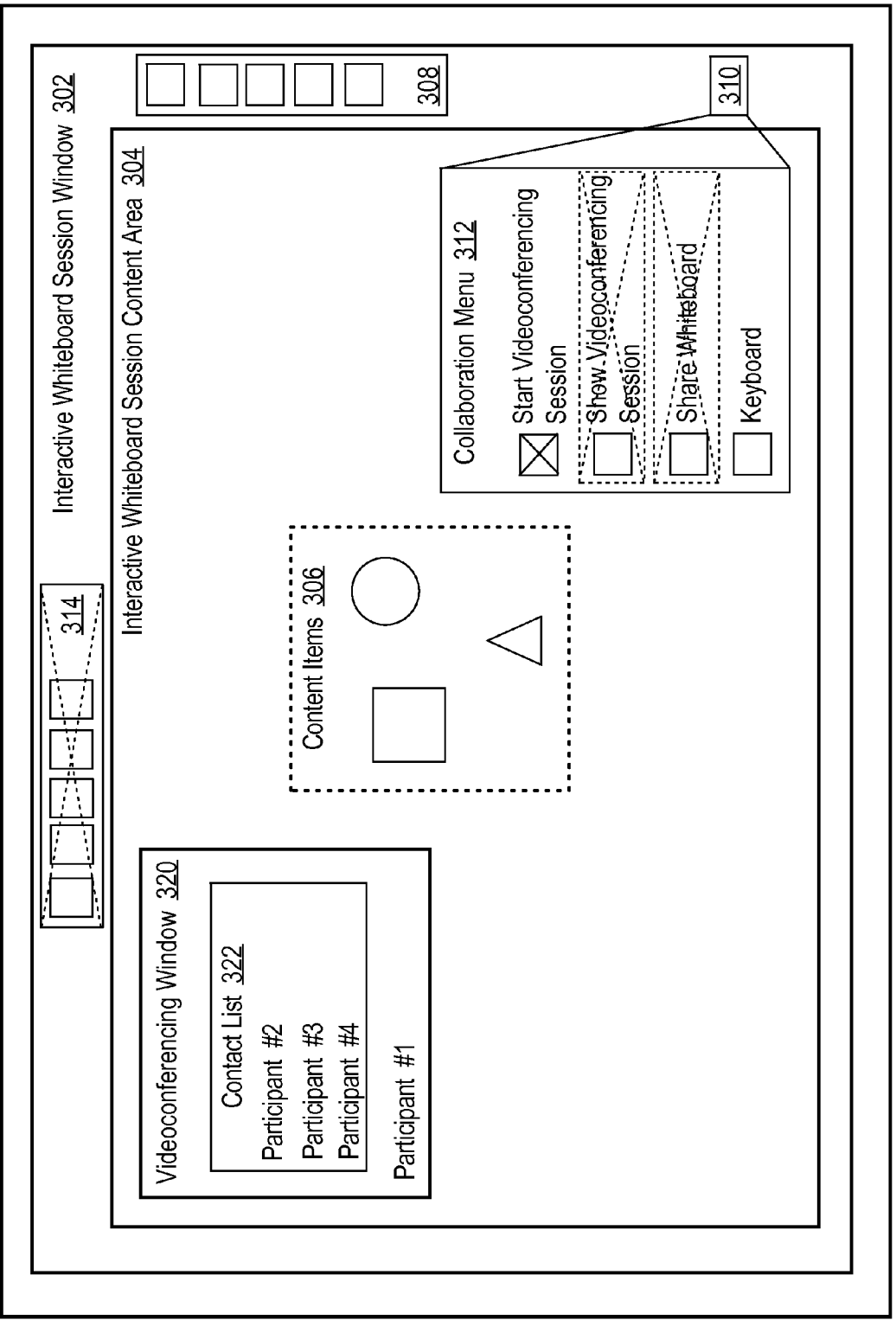
FIG. 3C depicts an interactive whiteboard display after a user has selected a "Start Videoconferencing Session" option from a collaboration menu.

FIG. 3C depicts interactive whiteboard display 300 after a user has selected the "Start Videoconferencing Session" option from collaboration menu 312. In response to this selection, application manager 128 causes a videoconferencing window 320 to be displayed in interactive whiteboard session content area 304. Videoconferencing window 320 includes a contact list 322 of candidate participants with whom a videoconferencing session may be initiated. In this example, the interactive whiteboard appliance 102 is considered to be "Participant #1." Collaboration menu 312 is depicted in FIG. 3C for purposes of explanation, but may be hidden and then re-displayed via collaboration menu icon 310, as previously described herein.

Figure 3D:
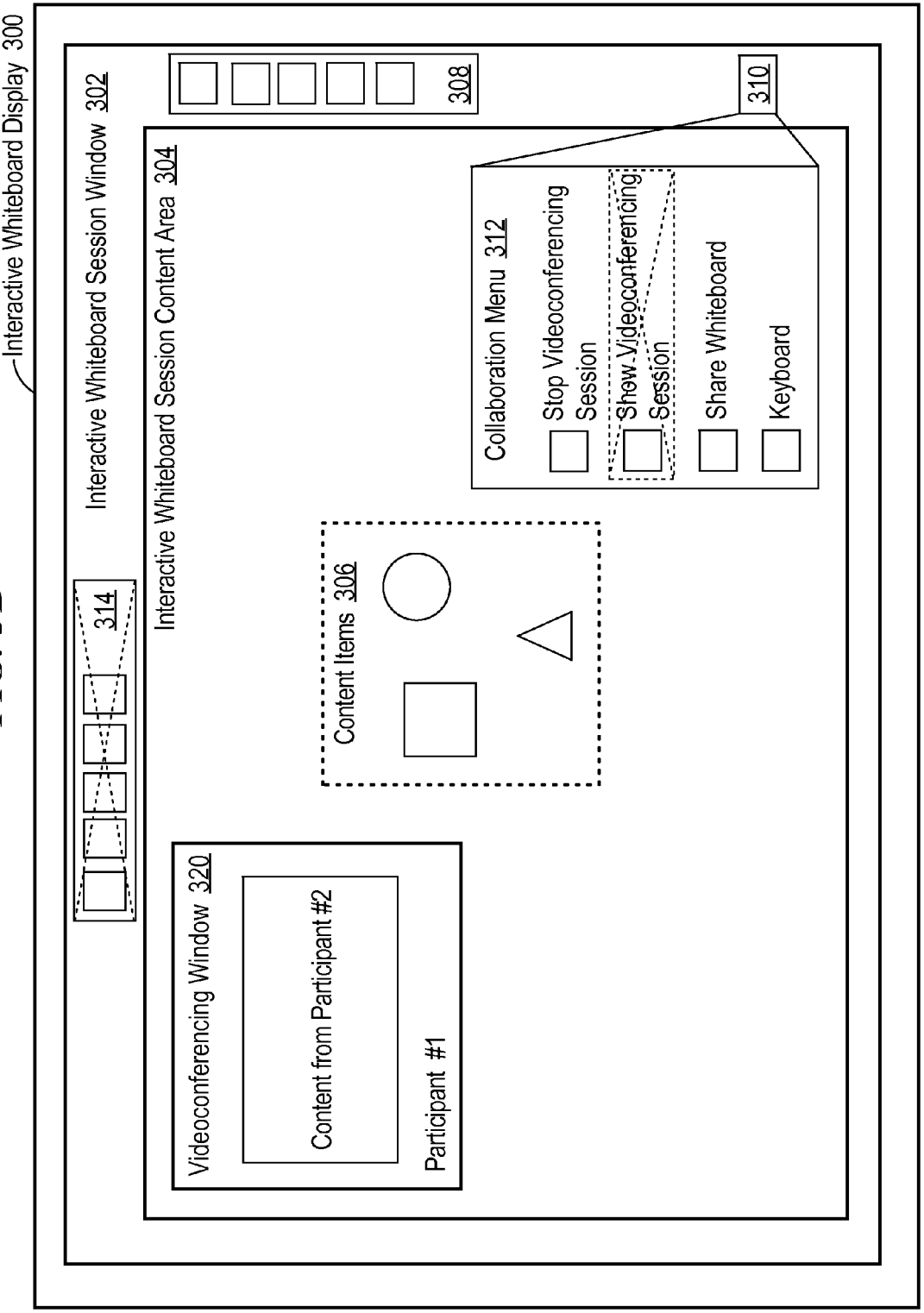
FIG. 3D depicts interactive whiteboard display after a videoconferencing session has been established between an interactive whiteboard appliance and a participant on another device.

FIG. 3D depicts interactive whiteboard display 300 after a videoconferencing session has been established between the interactive whiteboard appliance 102 ("Participant #1") and Participant #2, for example, a user of client device 104. At this point in time, users of the interactive whiteboard appliance 102 and Participant #2 may engage in a videoconferencing session via videoconferencing window 320 and a corresponding videoconferencing window provided via collaboration client 146 on client device 104. Collaboration menu 312 has been updated to change the "Start Videoconferencing Session" option to "Stop Videoconferencing Session" and the "Share Whiteboard" option is now available for selection.

C. Sharing a Whiteboard

FIG. 2C is a flow diagram 240 that depicts a process for sharing a whiteboard after a videoconferencing session has been established. In step 242, application manager 128 monitors for selection of the "Share Whiteboard" option from collaboration menu 312. In step 244, the application manager 128 detects selection of the "Share Whiteboard" option from collaboration menu 312.

Figure 3E:
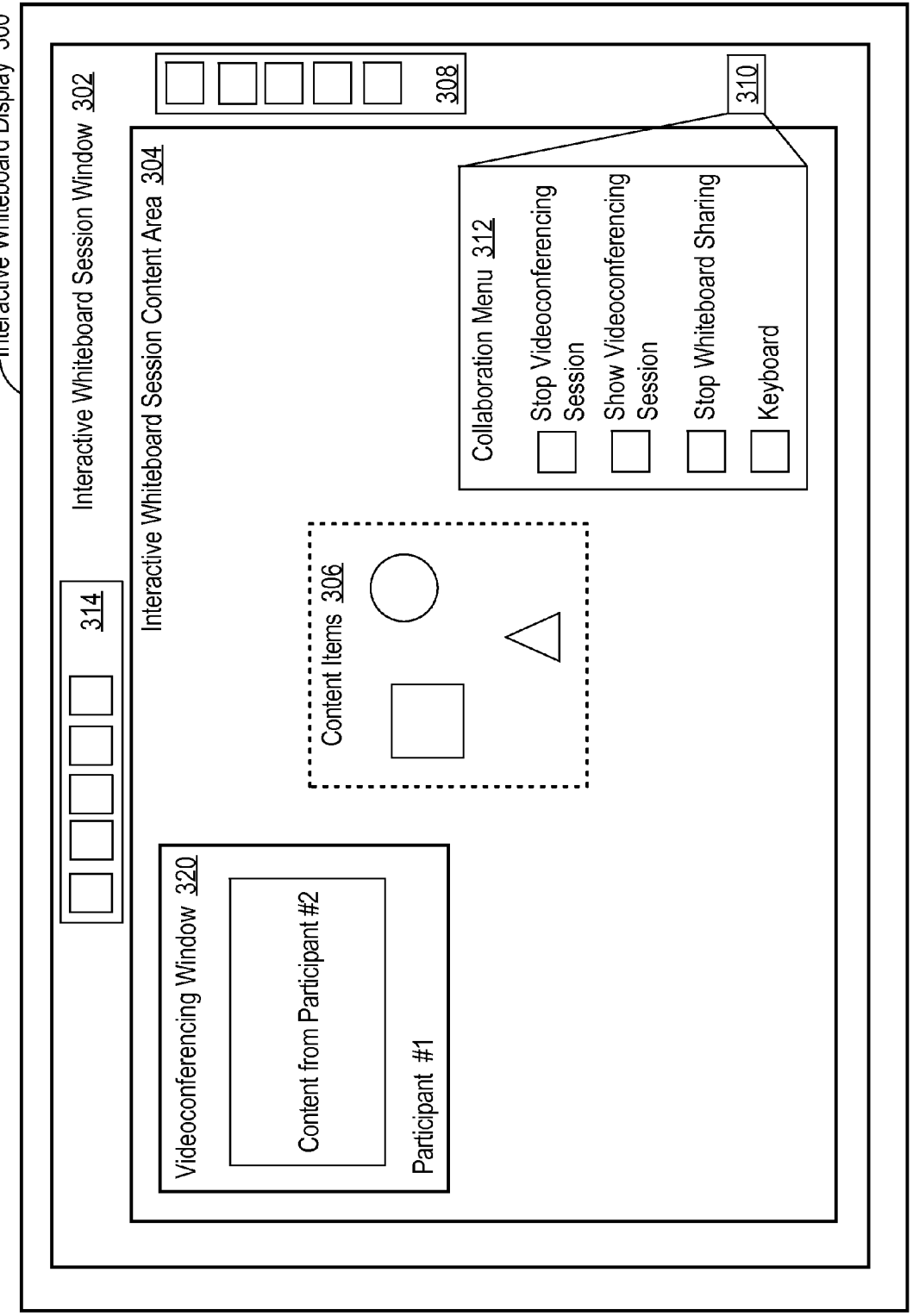
FIG. 3E depicts a collaboration menu that has been updated to make a "Show Videoconferencing Session" option active and to change a "Share Whiteboard" option to a "Stop Whiteboard Sharing" option.

In step 246, application manager 128 invokes whiteboard sharing via collaboration library 136 which allows the interactive whiteboard session window 302 to be shared with Participant #2 via client device 104. In step 248, application manager 128 causes the whiteboard sharing controls 314 to be displayed or enabled in interactive whiteboard session window 302. The whiteboard sharing controls 314 allow the users to select which user is currently presenting, to give control to another user, and/or to stop presenting. This allows users to dynamically share content as it is updated in the interactive whiteboard session content area 304. In step 250, the collaboration menu 312 is updated to reflect that whiteboard sharing is currently active. For example, FIG. 3E depicts that the collaboration menu 312 has been updated to make the "Show Videoconferencing Session" option active and to change the "Share Whiteboard" option to a "Stop Whiteboard Sharing" option. The controls provided in collaboration menu 312 allow a user to switch between the videoconferencing window 320 and the interactive whiteboard session window 302. In the situation where a user has selected the "Show Videoconferencing Session" option and the videoconferencing window 320 has been brought to the top, as previously described herein, the menu option "Show Videoconferencing Session" or "Stop Whiteboard Sharing" may be changed to "Show Whiteboard" to allow a user to easily switch between the videoconferencing window 320 and the interactive whiteboard session window 302.

IV. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
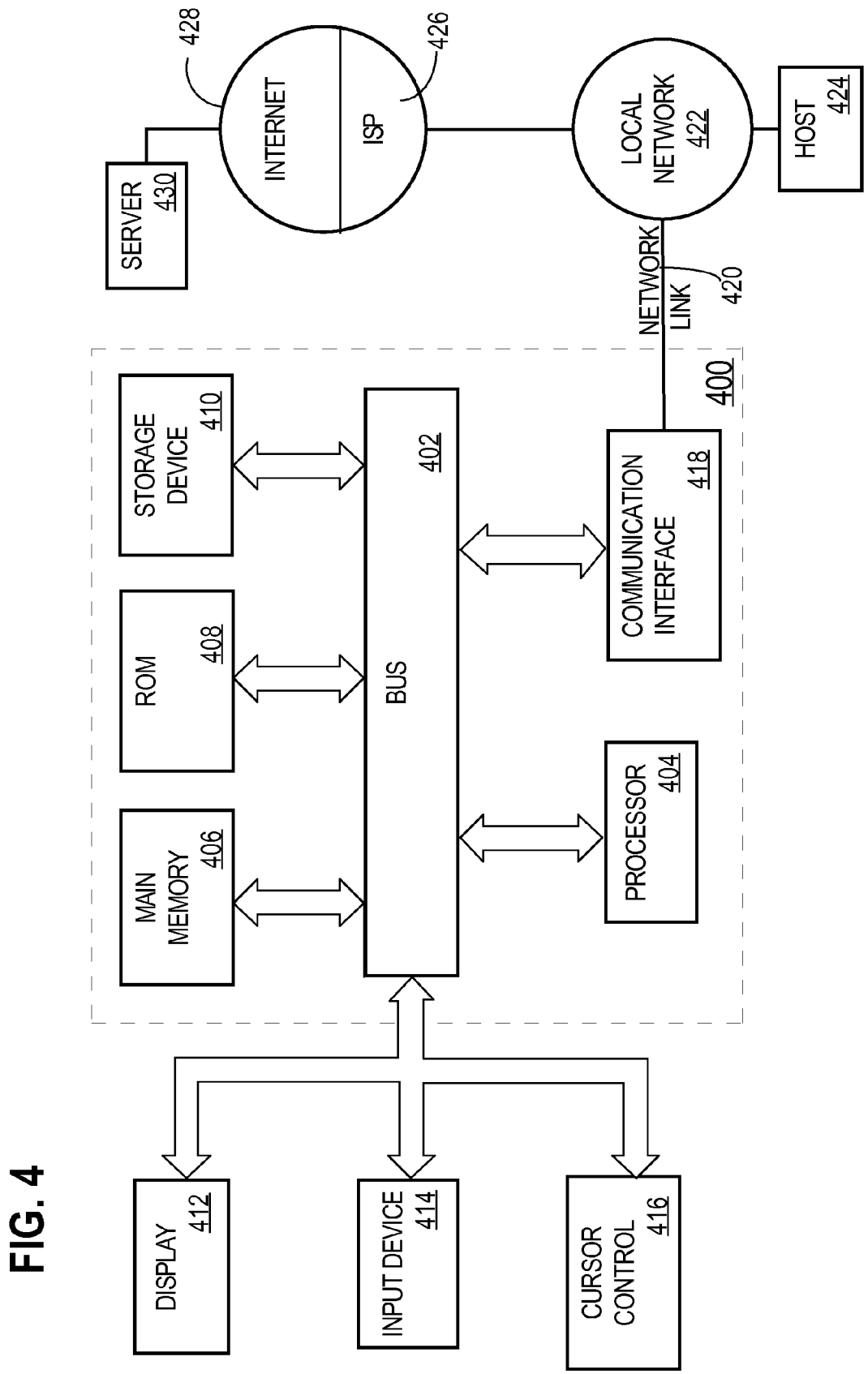
FIG. 4 is a block diagram that depicts an example computer system upon which embodiments may be implemented.

FIG. 4 is a block diagram that depicts an example computer system 400 upon which embodiments may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. Although bus 402 is illustrated as a single bus, bus 402 may comprise one or more buses. For example, bus 402 may include without limitation a control bus by which processor 404 controls other devices within computer system 400, an address bus by which processor 404 specifies memory locations of instructions for execution, or any other type of bus for transferring data or signals between components of computer system 400.

An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic or computer software which, in combination with the computer system, causes or programs computer system 400 to be a special-purpose machine. According to one embodiment, those techniques are performed by computer system 400 in response to processor 404 processing instructions stored in main memory 406. Such instructions may be read into main memory 406 from another computer-readable medium, such as storage device 410. Processing of the instructions contained in main memory 406 by processor 404 causes performance of the functionality described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 400, various computer-readable media are involved, for example, in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406. Common forms of computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of computer-readable media may be involved in storing instructions for processing by processor 404. For example, the instructions may initially be stored on a storage medium of a remote computer and transmitted to computer system 400 via one or more communications links. Bus 402 carries the data to main memory 406, from which processor 404 retrieves and processes the instructions. The instructions received by main memory 406 may optionally be stored on storage device 410 either before or after processing by processor 404.

Computer system 400 also includes a communication interface 418 coupled to bus 402. Communication interface 418 provides a communications coupling to a network link 420 that is connected to a local network 422. For example, communication interface 418 may be a modem to provide a data communication connection to a telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be processed by processor 404 as it is received, and/or stored in storage device 410, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An interactive whiteboard appliance comprising:
   a display;
   a communications interface;
   one or more processors;
   one or more memories;
   an operating system executing on the interactive whiteboard appliance and having an application programming interface that provides access to functionality supported by the operating system;
   an interactive whiteboard application configured to display an interactive whiteboard window on the display of the interactive whiteboard appliance, wherein the interactive whiteboard window includes an interactive whiteboard content area for displaying content that is shared with one or more client devices that are external to the interactive whiteboard appliance;
   a collaboration client configured to support one or more videoconferencing sessions with one or more collaboration clients executing on the one or more client devices that are external to the interactive whiteboard appliance including displaying a videoconferencing window on the display of the interactive whiteboard appliance, wherein the videoconferencing window supports a videoconferencing session and is overlaid on top of the interactive whiteboard content area of the interactive whiteboard window, such that both the content and the videoconferencing window are displayed simultaneously;
   an application manager configured to:
      cause a collaboration menu to be displayed, on the display of the interactive whiteboard appliance, wherein the collaboration menu includes one or more controls for switching between the interactive whiteboard application window and the videoconferencing window, controlling sharing of the content with the one or more client devices, and controlling the videoconferencing session in the videoconferencing window, detect a user selection of a particular control from the one or more controls for switching between the interactive whiteboard window and the videoconferencing window, controlling sharing of the content with the one or more client devices, and controlling the videoconferencing session in the videoconferencing window, manage display of the interactive whiteboard window and the videoconferencing window in response to detecting the user selection of the particular control from the one or more control for switching between the interactive whiteboard application window and the videoconferencing window, controlling sharing of the content with the one or more client devices, and controlling the videoconferencing session in the videoconferencing window.

2. The interactive whiteboard appliance of claim 1, wherein the application manager is further configured to maintain the videoconferencing window on top of the interactive whiteboard window during a videoconferencing session.

3. The interactive whiteboard appliance of claim 2, wherein the application manager is further configured to maintain the videoconferencing window on top of the interactive whiteboard window during a videoconferencing session by specifying one or more values used by the operating system executing on the interactive whiteboard appliance.

4. The interactive whiteboard appliance of claim 2, wherein the application manager is further configured to cause the interactive whiteboard window to be moved on top of the videoconferencing window in response to termination of the videoconferencing session.

5. The interactive whiteboard appliance of claim 1, wherein the application manager is further configured to cause the interactive whiteboard window to be shared with the one or more client devices that are external to the interactive whiteboard appliance by invoking functionality provided by a collaboration library on the interactive whiteboard appliance.

6. The interactive whiteboard appliance of claim 1, wherein the collaboration client is a Microsoft Lync client, the operating system is a Microsoft operating system and the application manager is configured to manage display of the interactive whiteboard window and the videoconferencing window in response to detecting the user selection of the particular control from the one or more controls for switching between the interactive whiteboard application window and the videoconferencing window by setting, in the Microsoft operating system, a topmost bit for the interactive whiteboard window and the videoconferencing window.

7. The interactive whiteboard appliance of claim 1, wherein the application manager is further configured to cause the collaboration menu to be updated in response to managing the display of the interactive whiteboard window and the videoconferencing window in response to detecting the user selection of the particular control from the one or more controls for switching between the interactive whiteboard application window and the videoconferencing window.

8. One or more non-transitory computer-readable media storing instructions which, when processed by one or more processors, cause:

an application manager executing on an interactive whiteboard appliance to:

cause a collaboration menu to be displayed on the display of the interactive whiteboard appliance, wherein the collaboration menu includes one or more controls for switching between an interactive whiteboard application window displayed by an interactive whiteboard application and a videoconferencing window displayed by a collaboration client executing on the interactive whiteboard appliance, controlling sharing of content between the interactive whiteboard appliance and the one or more client devices that are external to the interactive whiteboard appliance, and controlling a videoconferencing session in the videoconferencing window, wherein the interactive whiteboard window includes an interactive whiteboard content area for displaying content that is shared with one or more client devices that are external to the interactive whiteboard appliance, and wherein the videoconferencing window supports a videoconferencing session and is overlaid on top of the interactive whiteboard content area of the interactive whiteboard window, such that both the content and the videoconferencing window are displayed simultaneously, detect a user selection of a particular control from the one or more controls for switching between the interactive whiteboard window and the videoconferencing window, controlling sharing of the content with the one or more client devices, and controlling the videoconferencing session in the videoconferencing window, manage display of the interactive whiteboard window and the videoconferencing window in response to detecting the user selection of the particular control from the one or more controls for switching between the interactive whiteboard application window and the videoconferencing window, controlling sharing of the content with the one or more client devices, and controlling the videoconferencing session in the videoconferencing window.

9. The one or more non-transitory computer-readable media of claim 8, further comprising additional instructions which, when processed by the one or more processors, cause the application manager to maintain the videoconferencing window on top of the interactive whiteboard window during a videoconferencing session.

10. The one or more non-transitory computer-readable media of claim 9, further comprising additional instructions which, when processed by the one or more processors, cause the application manager to maintain the videoconferencing window on top of the interactive whiteboard window during a videoconferencing session by specifying one or more values used by the operating system executing on the interactive whiteboard appliance.

11. The one or more non-transitory computer-readable media of claim 9, further comprising additional instructions which, when processed by the one or more processors, cause the application manager to cause the interactive whiteboard window to be moved on top of the videoconferencing window in response to termination of the video conferencing session.

12. The one or more non-transitory computer-readable media of claim 8, further comprising additional instructions which, when processed by the one or more processors, cause the application manager to cause the interactive whiteboard window to be shared with the one or more client devices that are external to the interactive whiteboard appliance by invoking functionality provided by a collaboration library on the interactive whiteboard appliance.

13. The one or more non-transitory computer-readable media of claim 8, wherein the collaboration client is a Microsoft Lync client, the operating system is a Microsoft operating system and the application manager is configured to manage display of the interactive whiteboard window and the videoconferencing window in response to detecting the user selection of the particular control from the one or more controls for switching between the interactive whiteboard application window and the videoconferencing window by setting, in the Microsoft operating system, a topmost bit for the interactive whiteboard window and the videoconferencing window.

14. The one or more non-transitory computer-readable media of claim 8, further comprising additional instructions which, when processed by the one or more processors, cause the application manager to cause the collaboration menu to be updated in response to managing the display of the interactive whiteboard window and the videoconferencing window in response to detecting the user selection of the particular control from the one or more controls for switching between the interactive whiteboard application window and the videoconferencing window.

15. A computer-implemented method comprising:
an application manager executing on an interactive whiteboard appliance:
causing a collaboration menu to be displayed on the display of the interactive whiteboard appliance, wherein the collaboration menu includes one or more controls for switching between an interactive whiteboard application window displayed by an interactive whiteboard application and a videoconferencing window displayed by a collaboration client executing on the interactive whiteboard appliance, controlling sharing of content between the interactive whiteboard appliance and the one or more client devices that are external to the interactive whiteboard appliance, and controlling a videoconferencing session in the videoconferencing window, wherein the interactive whiteboard window includes an interactive whiteboard content area for displaying content that is shared with one or more client devices that are external to the interactive whiteboard appliance, and wherein the videoconferencing window supports a videoconferencing session and is overlaid on top of the interactive whiteboard content area of the interactive whiteboard window, such that both the content and the videoconferencing window are displayed simultaneously, detecting a user selection of a particular control from the one or more controls for switching between the interactive whiteboard window and the videoconferencing window, controlling sharing of the content with the one or more client devices, and controlling the videoconferencing session in the videoconferencing window,
managing display of the interactive whiteboard window and the videoconferencing window in response to detecting the user selection of the particular control from the one or more controls for switching between the interactive whiteboard application window and the videoconferencing window, controlling sharing of the content with the one or more client devices, and controlling the videoconferencing session in the videoconferencing window.

16. The computer-implemented method of claim 15, further comprising the application manager maintaining the videoconferencing window on top of the interactive whiteboard window during a videoconferencing session.

17. The computer-implemented method of claim 16, further comprising the application manager maintaining the videoconferencing window on top of the interactive whiteboard window during a videoconferencing session by specifying one or more values used by the operating system executing on the interactive whiteboard appliance.

18. The computer-implemented method of claim 16, further comprising the application manager causing the interactive whiteboard window to be moved on top of the videoconferencing window in response to termination of the videoconferencing session.

19. The computer-implemented method of claim 15, further comprising the application manager causing the interactive whiteboard window to be shared with the one or more client devices that are external to the interactive whiteboard appliance by invoking functionality provided by a collaboration library on the interactive whiteboard appliance.

20. The computer-implemented method of claim 15, wherein the collaboration client is a Microsoft Lync client, the operating system is a Microsoft operating system and the application manager is configured to manage display of the interactive whiteboard window and the videoconferencing window in response to detecting the user selection of the particular control from the one or more controls for switching between the interactive whiteboard application window and the videoconferencing window by setting, in the Microsoft operating system, a topmost bit for the interactive whiteboard window and the videoconferencing window.

* * * * *